United States Patent Office 3,518,829
Patented July 7, 1970

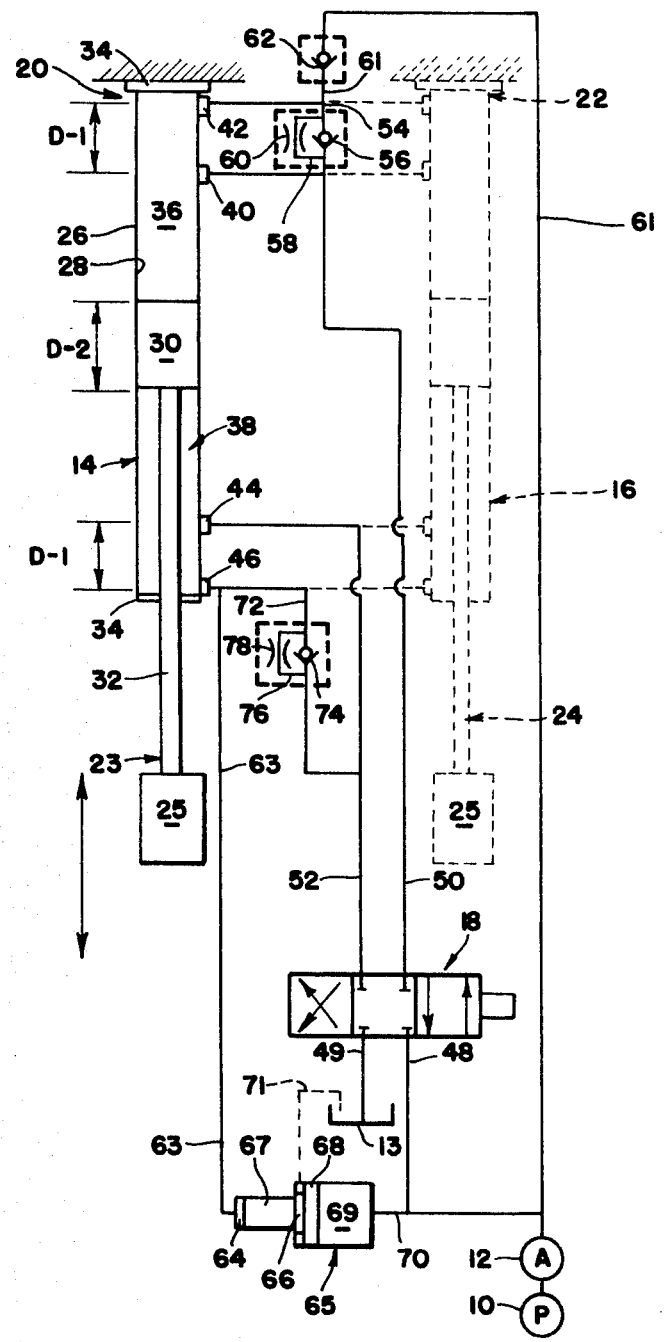

3,518,829
FLUID MOTOR BRAKE MECHANISM
Haim J. Kamner, 2720 W. Rascher St.,
Chicago, Ill. 60625
Filed Oct. 8, 1968, Ser. No. 765,827
Int. Cl. F15b 1/02, 15/22; F01b 11/02
U.S. Cl. 60—51                                                    11 Claims

ABSTRACT OF THE DISCLOSURE

A brake mechanism for a fluid cylinder having a piston and rod assembly reciprocably mounted therein which defines head and rod chambers. Each of the chambers are further defined by an end plate fixed to the cylinder on the outer axial end of the respective chamber. First and second fluid parts are provided in each of said chambers, all ports being adapted to be placed in fluid communication with either a fluid reservoir, or a fluid pressure accumulator, by first and second conduit means. Each of the first ports is axially spaced from its respective chamber end plate a distance less than the longitudinal axial dimension of the piston whereby bottoming of the piston against either end plate closes the respective first port. Each of the second ports is axially closer to its respective end plate than the first port and is additionally adapted to be operatively connected by third conduit means to the fluid pressure accumulator whereby bottoming of the piston in either chamber charges the accumulator thereby cushioning against inertia or shock loads upon bottoming of the piston without generation of extremely high pressures or provoking heat dissipation problems.

BACKGROUND OF THE INVENTION

This invention relates generally to fluid motor cylinders and, more particularly, to fluid cylinder brake mechanisms for cushioning impact or shock loads of a piston upon bottoming in a cylinder.

In applicant's assignee copending application by Sutherland, Ser. No. 692,749, filed Dec. 22, 1967 entitled "Tree Harvester," a standing tree harvesting and processing device is disclosed, the device includes hydraulically operated upper and lower shear-clamp assemblies for clamping a device to a standing tree and subsequently topping, delimbing, scoring and bucking a tree into pulpwood lengths. The upper and lower sections are relatively vertically moveable by vertical hydraulic cylinders to facilitate a step-by-step harvesting action as the device descends a standing tree.

In operating a device of the type disclosed in the heretofore identified Sutherland application to harvest trees of heights of 50 to 60 feet, a cycle of operation including extension and retraction of each of the hydraulic cylinders for the various components must be repeated from 12 to 14 times per tree. To minimize overall operating time, cylinder extension and retraction must be at high speeds. Consequently, substantial fluid flow under substantial pressure must be directed at high velocity to move each of the cylinders for each of the relatively heavy components. However, upon high speed component movement, substantial inertia forces and high fluid pressures may be generated thereby raising the danger of cylinder element damage from shock loads upon piston bottoming. Additionally, troublesome hydraulic fluid heat dissipation problems may be provoked.

SUMMARY OF THE INVENTION

It is the general object of the present invention to provide a fluid motor brake mechanism which minimizes or circumvents the problems heretofore noted.

In achieving this general object, the present invention provides a fluid motor brake mechanism including a closed cylinder having a bore therein. A piston and rod assembly is reciprocably mounted in the bore and defines head and rod end chambers in the closed cylinder. At least one of the chambers further is defined by an end plate fixed to the cylinder on the outer axial end of one of the chambers. First and second fluid ports are provided in the cylinder and in the said one chamber, at least one of said ports adapted to be connected to a fluid reservoir. The first port is axially spaced from the end plate a distance less than the longitudinal axial dimension of the piston of the piston and rod assembly whereby bottoming of the piston in said one chamber closes the first port. The second port is axially spaced from the first port and closer to the end plate. Fluid pressure accumulating means are operatively connected to the second port whereby bottoming of said piston in said one chamber charges the accumulator means.

BRIEF DESCRIPTION OF THE DRAWING

A bettter understanding of one embodiment of the present invention may be gained by reference to the accompanying drawing, in which:

The lone figure is a schematic diagram of a fluid circuit of a fluid cylinder brake means according to the present invention.

DETAILED DESCRIPTION OF THE INVENTION

Referring in more detail to the drawing, a fluid motor brake mechanism according to the present invention basically comprises a source of fluid under pressure such as a fluid pump 10 for charging a generally conventional fluid pressure accumulator 12. It is noted that the pump 10 operates intermittently to maintain the accumulator fluid pressure at a constant pre-established level. The accumulator 12 and a fluid reservoir 13 may be placed in fluid communication with a pair of hydraulic cylinder assemblies 14 and 16 by selective operation of a selector valve 18.

The cylinder assemblies 14 and 16 may be of the double-acting type, such as the vertical cylinder interposed between the relatively moveable upper and lower sections of the heretofore identified Sutherland application device. However, for purposes of the instant disclosure, the upper ends 20, 22 of the cylinder assemblies 14 and 16 may be considered to be fixed and only the rod ends 23 and 24 considered to be moveable and connected to a load 25 of a substantial weight. Further, because the cylinder assemblies 14 and 16 are substantially identical and are in fluid communication with each other, cooperation of the various elements of the present invention will be discussed hereinafter in relation to but one cylinder assembly 14, it being understood that the assembly 16 operates in the same manner.

The cylinder assembly 14 comprises a cylinder 26 having a bore 28 therein in which is reciprocably mounted a piston 30. This piston 30 is operatively connected to a rod 32 which projects from the cylinder 26 and is connected to the load 25 to be manipulated. Each axial end of the cylinder 26 is closed by an end plate 34. The piston 30 and rod 32, together with the cylinder 26 and end plates 34, define head and rod chambers 36 and 38, respectively. The head chamber 36 is provided with axially spaced first and second ports 40, 42, respectively, and the rod chamber 38 is likewise provided with third and fourth ports 44, 46. The second and fourth ports 42, 46 are positioned relatively close to the end plates and the outer axial ends of the head and rod chamber 36, 38.

Of particular significance is the aspect of the present invention wherein the first and third ports 40, 44, are spaced from their respective end plates 34 a distance D–1 less than the axial dimension D–2 of the piston 30 whereby, as the piston 30 approaches bottoming in either the head and rod chambers 36, 38 either of the first or third ports 40, 44 is closed to fluid communication with the reservoir 13 for purposes to be discussed hereinafter.

For placing the selector valve 18 in fluid communication with the accumulator 12 and the reservoir 13, conduits 48 and 49 are provided. The selector valve 18 is of the three position spool-type for extending, retracting or holding the cylinder assembly 14 in a given position. A pair of conduits 50, 52 in fluid communication with the valve 18 are provided to place the first and third ports 40, 44 of the head and rod chambers 36 and 38 in fluid communication with the accumulator 12 or reservoir 13. The second port 42 of the head chamber 36 is connected by a conduit 54 to the conduit 50 and a one-way check valve 56 is interposed therein to block substantial flow away from the port 42 to the conduit 50. A bypass conduit 58 having a restriction 60 therein is provided to bypass the check valve 56 to permit limited flow from the second port 42 to the conduit 50. The conduit 54 is further connected by a conduit 61 to the output of the accumulator 12 and a one-way check valve 62 is interposed therein to prohibit flow through the conduit 61 away from the accumulator 12.

The fourth port 46 of the rod chamber 38 is connected by a conduit 63 to a first chamber 64 of a fluid pressure reducer assembly 65 having a piston 66 of a varying diameter reciprocally mounted therein. The piston 66 includes a small diameter end 67 defining one end of the first chamber 64 and a large diameter end 68 defining one end of a second chamber 69. The second chamber 69 is placed in fluid communication with the accumulator 12 by a conduit 70 and a drain line 71 connects the reducer assembly 65 to the reservoir 13.

The fourth port 46 of the rod chamber 38 is further connected by a conduit 72 to the conduit 52 which is in fluid communication with the spool valve 18. Positioned in the conduit 72 is a one-way check valve 74 for prohibiting substantial flow from the fourth port 46 to the conduit 52. A bypass conduit 76 having a restriction 78 therein is provided to permit a limited flow from the fourth port 46 to the conduit 52.

Operation of a fluid motor brake mechanism according to the present invention may be summarized as follows. Assuming the cylinder assembly 14 is initially in a fully retracted position and the piston 30 is bottomed against the upper end plate 34, upon selective movement of the spool valve 18 to the left from the position shown in FIG. 1, fluid under pre-established pressure is directed from the accumulator 12, through the conduits 48 and 50, through the check valve 56 and the conduit 54, to the second port 42 and into the head chamber 36. Simultaneously, fluid from the rod chamber 38 is dumped or returned through the third port 44, through the conduit 52, to the reservoir 13. A minor amount of fluid flow is likewise directed through the fourth port 46, through the conduit 72, the bypass 76, to the conduit 52. Upon extension of the cylinder assembly 14 by an amount equal to the axial dimension of the piston 30, the first port 40 of the head chamber 36 is uncovered and fluid flow from the accumulator 12 is directed through this port. Such operation will proceed in this manner as long as the extension is slow, inertia forces are not substantial and impact or shock loads are not generated. Upon extension of the cylinder assembly 14 to the point where the lower portion of the piston 30 covers the third port 44 of the rod chamber 38, return fluid may only exit from the rod chamber 38 through the fourth port 46. Because major return flow is blocked by the check valve 74 and restricted by the restriction 78 in the bypass 76, fluid flow is directed through the conduit 63 to the first chamber 64 of the reducer 65. Upon generation of elevated pressures in the rod chamber 38 and consequently in the first chamber 64 of the reducer 65 which are sufficient when acting upon the small end 67 of the piston 66 to overcome the force generated by fluid pressure induced by the accumulator 12 on the large end 68, piston 66 will be moved to the right from the position shown in the drawing. Such piston movement elevates the pressure of the fluid in conduit 70 and consequently charges or recharges the accumulator 12. In this manner, piston damage as might be occasioned by forceful impact of the piston bottoming in the cylinder is circumvented by decelerating and cushioning such bottoming by a force generated by the accumulator fluid acting upon the reducer piston 66. However, heat dissipation problems that might be provoked by conversion of such excess fluid energy to heat as by utilization of a simple restriction in the return line, are circumvented. Maximum allowable pressure in the rod chamber is simply governed by regulation of the cushioning force by design variations of the ratio of the cross-sectional areas of the small and large ends of the reducer piston 66 and by pre-established accumulator pressure. But still further, shock and and inertia loads are dissipated and used constructively to recharge the accumulator 12 thereby reducing the work to be performed by the pump 10 in recharging the accumulator. Excess fluid energy which otherwise would be wasted is salvaged and used constructively to enhance efficiency of the hydraulic system. After excess fluid pressure in the rod chamber 38 is eliminated, the remainder of the blocked fluid is slowly returned to the reservoir through the bypass conduit 76 at a rate established by the restriction 78 and complete cylinder extension made possible.

Operation of the instant invention during retraction of the cylinder assembly 14 is as follows. The spool valve 18 is moved to a position to the right from that shown in FIG. 1, whereby fluid flow from the accumulator 12 is directed to the conduit 52, through the fourth port 46, and subsequently to third port 44, as the piston 30 moves to uncover this latter port. Retraction thus proceeds and return flow from the head chamber 36 is directed through the first port 40 and the conduit 50, to the reservoir 13 until the upper end of the piston 30 covers the first port 40 of the head chamber 36. At this point, upon the generation of pressures in the head chamber 36 in excess of those generated by the accumulator 12, the check valve 62 will be unseated and fluid flow directed through the port 42, the conduit 54, through the check valve 62 to the conduit 61 to thereby recharge the accumulator. It is noted that constructive dissipation of excess pressures in the head chamber 36 does not entail provision of a reducer, such as reducer 65 for the rod chamber 38, because of the inherent effective cross-sectional area difference between the head and rod end faces of the piston 30 upon which fluid pressure operates due to the area occupied by the rod. After the first port 40 is blocked by the piston 30 at least pre-established accumulator pressure acts on both faces of the piston 30, and because the effective area of the rod end face is less than that of the piston end face, full retraction of the cylinder is cushioned and decelerated. After dissipation of shock or inertia loads by recharging of the accumulator, complete retraction is only possible at a rate permitted by flow of fluid through the bypass restriction 60.

Should a condition arise wherein motion of the piston is stopped just prior to bottoming in either the head or the rod chambers, the bypass conduits 58, 76 having restrictions 60, 78 therein permit slow flow of the trapped fluid back to the reservoir 13 until piston 30 movement is stopped by contact with the respective end plate 34.

Finally, the present invention is equally advantageous in deceleration of the mass when stopped at any intermediate point between full extension or retraction by selective movement of the spool valve 18 to a hold position. By such spool valve movement, fluid flow in the conduits 50, 52 is blocked. If inertia forces or the like generate pressures in either chamber greater than accumulator pressure, the excess pressure is likewise constructively utilized in the manner discussed heretofore, to charge the accumulator.

By the provision of the present invention, inertia or shock forces are cushioned, maximum chamber pressure is limited, and rod movement decelerated without provoking extremely high pressures in the cylinder chambers and without inducing heat dissipation problems generated by converting fluid power to waste heat. Substantial hydraulic horsepower is saved and a smoother operational cycle maintained.

While in the foregoing description, reference has been made to but one specific embodiment of the present invention, it should be understood that the structure and operation thereof may be varied by those skilled in the art without departing from the spirit and scope of the present invention which is to be defined by the following claims.

What is claimed:

1. A fluid brake mechanism for fluid cylinder having a bore therein, said cylinder being closed at both axial ends thereof;
   a piston rod assembly reciprocably mounted in said bore and including a piston connected to a rod projecting from one end of said cylinder, said piston rod assembly defining, in conjunction with said cylinder ends, head and rod chambers in said cylinder, said piston having a longitudinal axis;
   first and second fluid ports in said cylinder communicating with at least one of said chambers, at least one of said ports adapted to be connected to a fluid reservoir;
   said first port being axially spaced from an adjacent cylinder end a distance less than the longitudinal axial dimension of said piston so that bottoming of said piston against said adjacent cylinder end closes said first port;
   said second port being axially spaced from said first port and closer to said adjacent cylinder end; and
   fluid pressure accumulator means connected to said second port whereby bottoming of said piston in said chamber charges said accumulator means.

2. A fluid brake mechanism according to claim 1 further including first conduit means connecting said first port to said reservoir and said accumulator means; selector valve means interposed in said first conduit means; and second conduit means connecting said second port to said accumulator means.

3. A fluid brake mechanism according to claim 2 further including third conduit means connecting said second port to said first conduit.

4. A fluid brake mechanism according to claim 3 wherein said cylinder further includes third and fourth ports communicating with the other of said chambers arranged in a like manner as said first and second ports in said one chamber; fourth conduit means connecting said third port to said selector valve means for connecting to said reservoir and said accumulator means; and fifth conduit means connecting said fourth port to said fourth conduit means.

5. A fluid brake mechanism according to claim 4 wherein said one chamber is said head chamber and said other chamber is said rod chamber, said mechanism further including fluid pressure reducer means, said reducer means including a bore having a first section of a small diameter and a second section of a larger diameter than said first section, a piston reciprocally mounted within said bore and defining, with said first and second sections, opposed first and second reducer chambers, respectively; sixth conduit means connecting said fourth port and said first reducer chamber and seventh conduit means connecting said second reducer chamber and said accumulator means.

6. A brake mechanism according to claim 5 further including check valve means interposed in said second conduit means to prohibit flow towards said second port.

7. A brake mechanism according to claim 6 further including check valve means interposed in said third and fifth conduits to prohibit flow towards said selector valve means.

8. A brake mechanism according to claim 7 wherein a bypass conduit is provided around each of said check valve means, said bypass conduit including flow restriction means.

9. A fluid brake mechanism for a fluid motor having a bore therein;
   a fluid reservoir;
   a fluid pressure accumulator providing fluid under a pre-established pressure;
   a piston movably mounted in said bore and defining therein first and second chambers;
   port means in said motor communicating with at least one of said chambers;
   conduit means connecting said port means to said reservoir and said accumulator;
   selector valve means connected to said conduit means for alternately connecting said port means to said reservoir and said accumulator; and
   moveable means in said conduit means between said accumulator and said port means for directing fluid to said reservoir when fluid pressure in said one chamber is less than said pre-established pressure but for redirecting fluid from said one chamber to said accumulator when fluid pressure in said one chamber is greater than said pre-established pressure.

10. A brake mechanism according to claim 9 wherein said moveable means comprises a one-way check valve.

11. A brake mechanism according to claim 9 wherein said moveable means comprises fluid reducer means including a bore, a piston movably mounted in said bore defining opposed first and second reducer chambers, one of said reducer chambers communicating with said port means and the other of said chamber communicating with said accumulator, said second reducer chamber having a greater cross-sectional area than said first reducer chamber.

References Cited

UNITED STATES PATENTS

| 1,877,102 | 9/1932 | Whitesell | 91—27 XR |
| 2,212,998 | 8/1940 | Crane. | |
| 2,729,942 | 1/1956 | Billings et al. | |
| 3,026,676 | 3/1962 | Wenzel et al. | |

EDGAR W. GEOGHEGAN, Primary Examiner

U.S. Cl. X.R.

91—26, 39.7; 92—11, 85